(12) United States Patent
Yamazaki et al.

(10) Patent No.: US 10,035,536 B2
(45) Date of Patent: Jul. 31, 2018

(54) BALL SCREW AND STEERING SYSTEM

(71) Applicant: JTEKT CORPORATION, Osaka-shi, Osaka (JP)

(72) Inventors: Eiji Yamazaki, Nagoya (JP); Masayuki Tsukagoshi, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 15/415,595

(22) Filed: Jan. 25, 2017

(65) Prior Publication Data

US 2017/0225706 A1   Aug. 10, 2017

(30) Foreign Application Priority Data

Feb. 4, 2016 (JP) ................................ 2016-019847

(51) Int. Cl.
 *B62D 5/04* (2006.01)
 *F16H 25/22* (2006.01)
 *F16H 25/20* (2006.01)

(52) U.S. Cl.
 CPC ....... *B62D 5/0448* (2013.01); *F16H 25/2223* (2013.01); *F16H 2025/2081* (2013.01); *F16H 2025/2096* (2013.01)

(58) Field of Classification Search
 CPC . B62D 5/0445; B62D 5/0448; F16H 25/2214; F16H 25/2219; F16H 25/2228
 See application file for complete search history.

(56) References Cited

U.S. PATENT DOCUMENTS

| 7,523,681 | B2 * | 4/2009 | Pan | F16H 25/2214 |
| | | | | 74/424.81 |
| 8,544,356 | B2 * | 10/2013 | Asakura | F16H 25/2214 |
| | | | | 180/444 |
| 8,863,598 | B2 * | 10/2014 | Asakura | B62D 5/0448 |
| | | | | 74/388 PS |

(Continued)

FOREIGN PATENT DOCUMENTS

EP   2 218 942 A1   8/2010
EP   2 784 351 A1   10/2014

(Continued)

OTHER PUBLICATIONS

Jun. 13, 2017 Extended Search Report issued in European Patent Application No. 17154036.2.

*Primary Examiner* — Kevin Hurley
(74) *Attorney, Agent, or Firm* — Oliff PLC (57) ABSTRACT

A ball screw in a steering system has a groove between the inner peripheral surface of a cylindrical ball nut through which a steered shaft extends and the outer peripheral surface of the steered shaft, and balls are accommodated in the groove. The balls rolling and flowing in the groove are returned from downstream to upstream via deflectors and a return passage member disposed in the ball nut. The return passage member has a first connection portion curved to connect one end of a linear portion of the return passage member to the first deflector, and a second connection portion curved to connect the other end of the linear portion to the second deflector. Each connection portion has an opening that opens in the return passage member longitudinal end face and an opening that opens in the return passage member outer periphery of toward the centerline of the ball nut.

7 Claims, 6 Drawing Sheets

(56) References Cited

U.S. PATENT DOCUMENTS

| | | | |
|---|---|---|---|
| 8,960,038 B2 * | 2/2015 | Chiu | ............... F16H 57/0497 74/424.71 |
| 2007/0006676 A1 | 1/2007 | Mizuhara et al. | |
| 2015/0284020 A1 | 10/2015 | Asakura et al. | |

FOREIGN PATENT DOCUMENTS

| | | |
|---|---|---|
| JP | 2004-353835 A | 12/2004 |
| JP | 2008-039050 A | 2/2008 |

* cited by examiner

BALL SCREW AND STEERING SYSTEM

INCORPORATION BY REFERENCE

The disclosure of Japanese Patent Application No. 2016-019847 filed on Feb. 4, 2016 including the specification, drawings and abstract, is incorporated herein by reference in its entirety.

BACKGROUND OF THE INVENTION

1. Field of the Invention

The present invention relates to ball screws and steering systems.

2. Description of the Related Art

Japanese Patent Application Publication No. 2004-353835 (JP 2004-353835 A) describes that a ball screw includes a ball nut and a ball screw shaft and functions to convert rotary motion of the ball nut to linear motion of the ball screw shaft. In such a ball screw, a plurality of balls are accommodated in grooves between the outer peripheral surface of the ball screw shaft and the inner peripheral surface of the ball nut, so that the ball screw converts rotary motion to linear motion and vice versa between the ball nut and the ball screw shaft via the plurality of balls and the grooves. For example, the above ball screw is used in a vehicle steering system to convert rotary motion of the ball nut, which is made by an assist actuator, to axial linear motion of a steered shaft (rack shaft).

In addition to ball screws, roller screws such as the one described in Japanese Patent Application Publication No. 2008-39050 (JP 2008-39050 A) are also known in the art. The roller screws use cylindrical rollers as rolling elements instead of the balls. In both the ball screws and the roller screws, the plurality of rolling elements roll in the grooves and thus move together in the grooves when the nut rotates relative to the shaft. It is therefore necessary to return the rolling elements in the grooves from downstream to upstream in the direction in which the rolling elements move so as to recirculate the rolling elements. Structures having a first deflector (recirculating element), a second deflector (recirculating element), and a return pipe, such as the one described in JP 2008-39050 A, are known as an example of structures that return the rolling elements in the grooves from downstream to upstream. The first deflector deflects the rolling elements rolling in the grooves, the return pipe carries the rolling elements from the first deflector to the second deflector, and the second deflector returns the deflected rolling elements to the grooves.

Specifically, the nut is provided with the first and second deflectors extending along the grooves, and the first and second deflectors are connected by the return pipe extending linearly in the axial direction of the nut. In this case, the rolling elements are deflected from the grooves by the first deflector in a downstream part of the grooves. The deflected rolling elements are then carried to the second deflector through the return pipe and are returned from the second deflector to the grooves.

However, if the direction in which the rolling elements flow changes at an acute angle in the connection portion between the first deflector and the return pipe and the connection portion between the return pipe and the second deflector, the rolling elements may not be able to smoothly pass through these connection portions.

The return pipe may be curved in portions connected to the first and second deflectors so that the direction in which the rolling elements flow changes gradually in these portions. However, if these portions of the return pipe are curved, these portions may be deformed, and the inside diameters of these portions, specifically the inside diameters of the return pipe in the direction of the radius of curvature of the curves of these portions, may be reduced. The rolling elements are therefore subjected to increased resistance when passing through these portions, and such increased resistance hinders smooth flow of the rolling elements.

SUMMARY OF THE INVENTION

It is one object of the present invention to provide a ball screw in which balls serving as rolling elements can flow smoothly and a steering system.

According to one aspect of the present invention, a ball screw includes: a ball nut; a ball screw shaft extending through the ball nut; a first deflector; a second deflector; and a return passage member. The ball screw has a groove formed between an outer peripheral surface of the ball screw shaft and an inner peripheral surface of the ball nut and accommodating a plurality of balls, and converts rotary motion and linear motion and vice versa between the ball nut and the ball screw shaft via the plurality of balls and the groove. When carrying out the conversion, the ball screw deflects the balls rolling in the groove by the first deflector, then carries the balls to the second deflector through the return passage member, and returns the balls from the second deflector to the groove, or the ball screw deflects the balls rolling in the groove by the second deflector, then carries the balls to the first deflector through the return passage member, and returns the balls from the first deflector to the groove. The first deflector and the second deflector are disposed in the ball nut so as to extend along the groove. The return passage member has a linear portion located between the first deflector and the second deflector in the ball nut, a first connection portion curved to serve as a portion connecting one end of the linear portion to the first deflector, and a second connection portion curved to serve as a portion connecting the other end of the linear portion to the second deflector. Each of the first and second connection portions has an opening in an outer periphery and an end face of the return passage member, and the opening in the outer periphery opens toward a centerline of the ball nut and is closed by an outer surface of the ball nut.

In the above configuration, the process of curving both longitudinal ends of the return passage member in order to form the first and second connection portions can be performed with a male die being inserted into the return passage member from the openings in the outer periphery at both longitudinal ends of the return passage member. This can restrain the dimension between the opposing inner walls of each of the first and second connection portions (hereinafter referred to as the "inside diameter" for convenience), namely the inside diameters of the first and second connection portions in a direction of the radius of curvature of the curves of the first and second connection portions, from being reduced by deformation of both longitudinal ends of the return passage member when both longitudinal ends of the return passage member are curved. If the inside diameters of the first and second connection portions are reduced as described above, the balls in the groove are subjected to increased resistance when they pass through the first connection portion and the second connection portion to recirculate through the first deflector, the return passage member, and the second deflector in the ball screw having the return passage member attached thereto. Such increased resistance hinders smooth flow of the balls. However, since reduction in inside diameter of the first and second connection portions is restrained, an increase in resistance the balls are subjected to when passing through the first and second connection portions can be restrained, whereby smooth flow of the balls can be achieved, and fluctuations in rotation resistance of the ball nut can be reduced.

The first and second connection portions may be curved as follows. Each of the first and second connection portions may be curved so that its centerline forms a curve. A center of the curve of the centerline of the first connection portion may be present in a region that is located closer to a position where the first deflector deflects the balls than an axis of the linear portion of the return passage member is in a direction perpendicular to the axis of the linear portion and that is located closer to a middle in an axial direction of the linear portion than the first deflector is in the axial direction of the linear portion, and a center of the curve of the centerline of the second connection portion may be present in a region that is located closer to a position where the second deflector returns the balls than the axis of the linear portion of the return passage member is in the direction perpendicular to the axis of the linear portion and that is located closer to the middle in the axial direction of the linear portion than the second deflector is in the axial direction of the linear portion.

The opening in the outer periphery of the first connection portion may open on a side of the first connection portion which faces the centerline of the ball nut along an entire longitudinal length of the first connection portion, the opening in the outer periphery of the second connection portion may open on a side of the second connection portion which faces the centerline of the ball nut along an entire longitudinal length of the second connection portion, and the linear portion may have an opening in its outer periphery. In this case, the opening of the linear portion may open on a side of the linear portion which faces the centerline of the ball nut along an entire longitudinal length of the linear portion, may connect to the opening in the outer periphery of the first connection portion and the opening in the outer periphery of the second connection portion, and may be closed by the outer surface of the ball nut.

In this configuration, the openings in the outer periphery of the return passage member are formed along an entire longitudinal length of the return passage member. Accordingly, the first and second connection portions can be formed by curving both longitudinal ends of the return passage member with the male die being inserted into the return passage member along the entire length of the return passage member from these openings. In this case, when both longitudinal ends of the return passage member are curved in order to form the first and second connection portions, the male die has been inserted in the return passage member along the entire longitudinal length of the return passage member. This can restrain the influence of the process of curving both longitudinal ends of the return passage member on the linear portion of the return passage member.

Each of the first connection portion, the linear portion, and the second connection portion may have a pair of standing walls extending parallel to each other in a direction in which the balls flow in the return passage member, and an inter-wall portion connecting one ends of the standing walls which are located farther away from the centerline of the ball nut. In this case, the opening in the outer periphery of the first connection portion, the opening in the outer periphery of the linear portion, and the opening in the outer periphery of the second connection portion are formed between the other ends of the pair of standing walls which are located closer to the centerline of the ball nut.

The return passage member may be fitted in a groove formed in an outer peripheral surface of the ball nut, and a bottom surface of the groove may serve as the outer surface of the ball nut which closes the opening in the outer periphery.

In this configuration, the return passage member is fitted in the groove formed in the outer peripheral surface of the ball nut and is connected to the first and second deflectors. The return passage member connecting the first and second deflectors can therefore be easily held in the ball nut.

In the ball screw of the above aspect, a passage hole for the balls, which is formed inside the first deflector, may be curved at its end located on the return passage member side, a centerline of the passage hole curved at its end may be continuous with the centerline of the first connection portion at a connection point with the centerline of the first connection portion, and the centerline of the passage hole curved at its end and the centerline of the first connection portion may have a common tangent at the connection point. A passage hole for the balls, which is formed inside the second deflector, may be curved at its end located on the return passage member side, a centerline of the passage hole curved at its end may be continuous with the centerline of the second connection portion at a connection point with the centerline of the second connection portion, and the centerline of the passage hole curved at its end and the centerline of the second connection portion may have a common tangent at the connection point.

The ball screw may be applied to a steering system including a steered shaft. In this case, a part of the steered shaft serves as the ball screw shaft of the ball screw.

In the above configuration, a steering system that operates smoothly can be implemented due to reduced fluctuations in rotation resistance of the ball nut.

The steering system may further include: a motor; and a cylindrical member that transmits torque of the motor to the ball nut. The cylindrical member may be fitted on the outer peripheral surface of the ball nut, and an inner peripheral surface of the cylindrical member may contact the return passage member.

In the above configuration, the return passage member disposed in the ball nut is held against the ball nut by the inner peripheral surface of the cylindrical member fitted on the outer peripheral surface of the ball nut. This can restrain the return passage member from coming off from the ball nut due to clogging of the return passage member with the balls or due to the centrifugal force generated by rotation of the ball nut.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

An embodiment of a ball screw and a steering system will be described below with reference to FIGS. 1 to 11.

Figure 1:
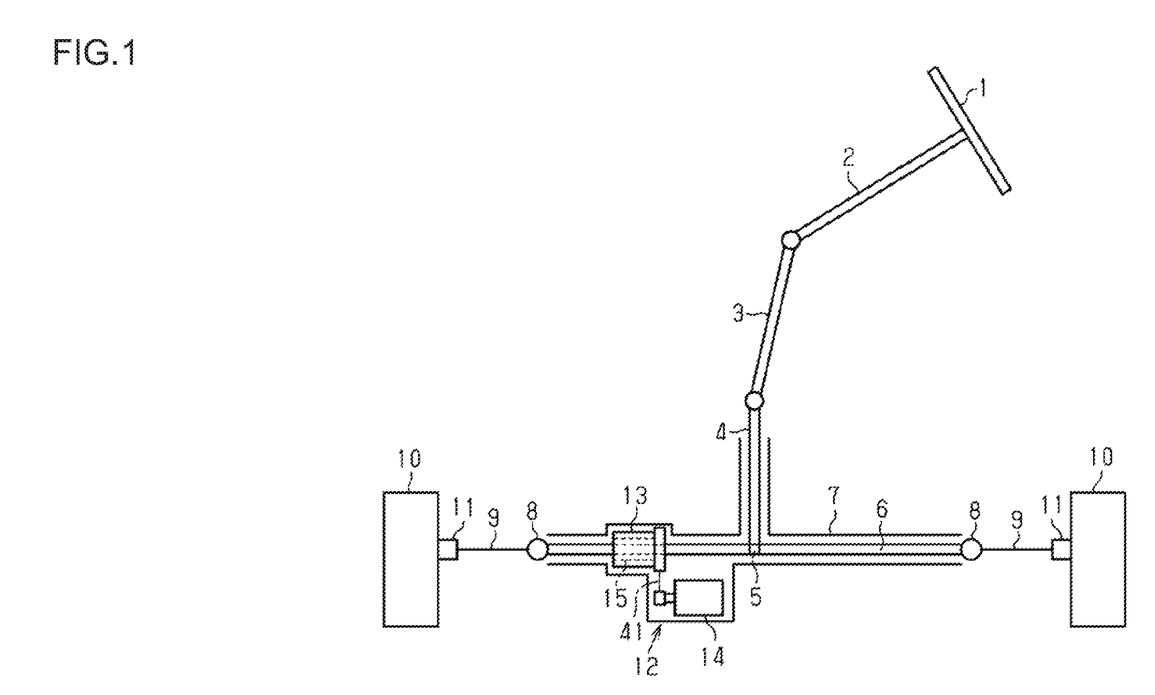
FIG. 1 is a schematic view showing the overall configuration of a steering system.

As shown in FIG. 1, a steering system of a vehicle includes a steering wheel 1 that is operated by a driver, and a column shaft 2 connecting to the steering wheel 1. The column shaft 2 is connected to an intermediate shaft 3 and a pinion shaft 4. The pinion shaft 4 is connected to a steered shaft 6 via a rack and pinion mechanism 5. The steered shaft 6 is supported by a housing 7 so that the steered shaft 6 can move in the axial direction thereof and does not rotate about its axis. The steered shaft 6 has its both axial ends connected to knuckles 11 of steered wheels 10 of the vehicle via ball joints 8 and tie rods 9.

When the driver of the vehicle turns the steering wheel 1, the column shaft 2 rotates about its central axis according to the turning of the steering wheel 1. When the column shaft 2 rotates in this manner, the intermediate shaft 3 and the pinion shaft 4 rotate about their central axes accordingly. The rack and pinion mechanism 5 converts the rotation of the pinion shaft 4 to axial linear movement of the steered shaft 6. The steered angle of the steered wheels 10 is changed by axial displacement of the steered shaft 6.

The steering system is provided with an assist device 12. The assist device 12 assists in axial movement of the steered shaft 6 which is made when the steering wheel 1 is turned by the driver. The assist device 12 includes a cylindrical ball nut 13, a motor 14, a ball screw 15, and a belt speed reduction mechanism 41. The steered shaft 6 extends through the ball nut 13. The motor 14 functions as an actuator that rotates the ball nut 13. The ball screw 15 converts rotary motion of the ball nut 13 to axial linear motion of the steered shaft 6. The belt speed reduction mechanism 41 amplifies rotation torque of the motor 14 to transmit the amplified rotation torque to the ball nut 13. Forward rotation of the motor 14 (ball nut 13) assists in linear movement of the steered shaft 6 to one side in the axial direction, and reverse rotation of the motor 14 (ball nut 13) assists in linear movement of the steered shaft 6 to the other side in the axial direction.

The structure of the ball screw 15 will be described in detail below.

Figure 2:
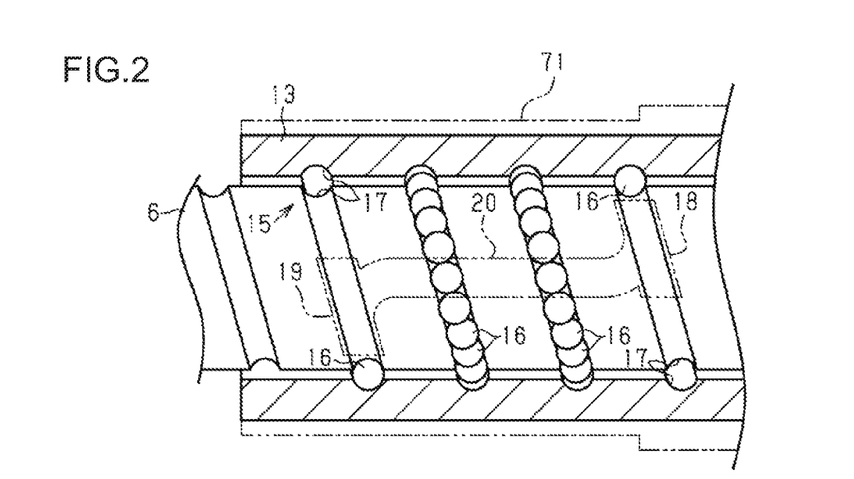
FIG. 2 is a sectional view showing the structure of a ball screw provided in the steering system.

As shown in FIG. 2, the ball screw 15 has grooves 17 between the outer peripheral surface of the steered shaft 6 extending through the ball nut 13 and the inner peripheral surface of the ball nut 13, and a multiplicity of balls 16 are accommodated in the grooves 17. The ball screw 15 converts rotary motion to linear motion and vice versa between the ball nut 13 and the steered shaft 6 via the multiplicity of balls 16 and the grooves 17. The ball screw 15 of this example converts rotary motion of the ball nut 13 to linear motion of the steered shaft 6. A driven pulley 71, which is driven to rotate by the motor 14, is fitted on the outer peripheral surface of the ball nut 13. The driven pulley 71 is a cylindrical member that transmits torque of the motor 14 (FIG. 1) to the ball nut 13. Instead of the driven pulley 71, a motor shaft, which is driven to rotate by the motor 14, may be used as the cylindrical member and fitted on the outer peripheral surface of the ball nut 13.

When the ball screw 15 converts rotary motion of the ball nut 13 to linear motion of the steered shaft 6, the multiplicity of balls 16 roll in the grooves 17 and thus move together in the grooves 17. It is therefore necessary to return the balls 16 in the grooves 17 from downstream to upstream in the grooves 17 so as to recirculate the balls 16. For this purpose, the ball screw 15 is provided with a ball recirculation system that implements the recirculation of the balls 16. The ball recirculation system includes a first deflector 18, a second deflector 19, and a return passage member 20. The first and second deflectors 18, 19 deflect the balls 16 from the grooves 17 and return the balls 16 to the grooves 17. The return passage member 20 carries the balls 16 between the first and second deflectors 18, 19.

When the ball nut 13 rotates in the forward direction, the first deflector 18 serves to deflect the balls 16 from the grooves 17, and the second deflector 19 serves to return the balls 16 to the grooves 17. In this case, the balls 16 flowing in the grooves 17 are deflected by the first deflector 18 located downstream in the flow of the balls 16. The balls 16 thus deflected are then carried through the return passage member 20 to the second deflector 19 located upstream in the flow of the balls 16 in the grooves 17. The balls 16 carried to the second deflector 19 are returned from the second deflector 19 to the grooves 17.

When the ball nut 13 rotates in the reverse direction, the second deflector 19 serves to deflect the balls 16 from the grooves 17, and the first deflector 18 serves to return the balls 16 to the grooves 17. In this case, the balls 16 flowing in the grooves 17 are deflected by the second deflector 19 located downstream in the flow of the balls 16. The balls 16 thus deflected are then carried through the return passage member 20 to the first deflector 18 located upstream in the flow of the balls 16 in the grooves 17. The balls 16 carried to the first deflector 18 are returned from the first deflector 18 to the grooves 17.

Figure 3:
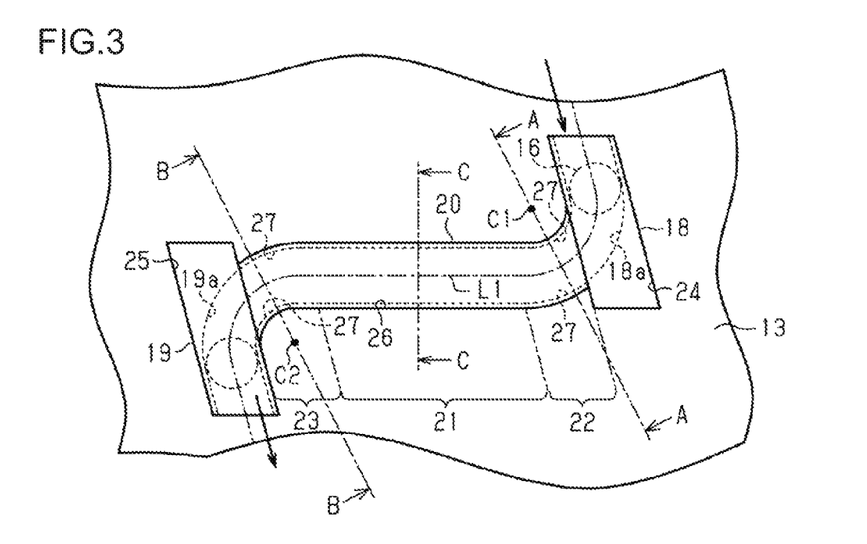
FIG. 3 is a plan view showing deflectors and a return passage member of a ball recirculation system provided in a ball nut of the ball screw.

As shown in FIG. 3, the first deflector 18 and the second deflector 19 are provided in the ball nut 13 so as to extend along the grooves 17 (FIG. 2). The return passage member 20 has a linear portion 21, a first connection portion 22, and a second connection portion 23. The linear portion 21 is formed between the first and second deflectors 18, 19 in the ball nut 13. The first connection portion 22 is curved so as to connect one end of the linear portion 21 to the first deflector 18. The second connection portion 23 is curved so as to connect the other end of the linear portion 21 to the second deflector 19.

Each of the first and second connection portions 22, 23 is curved so that its centerline forms a curve. If a small part of the centerline of each of the first and second connection portions 22, 23 is approximated by an arc to consider the radius of curvature, the approximate arc has a center. The center of the approximate arc is hereinafter referred to as the "center of the curve of the centerline." The center C1 of the curve of the centerline of the first connection portion 22 is present in a region that is located closer to the position where the first deflector 18 deflects the balls 16 than the axis L1 of the linear portion 21 is in the direction perpendicular to the axis L1 of the linear portion 21 (the vertical direction in FIG. 3) and that is located closer to the middle in the axial direction of the linear portion 21 than the first deflector 18 is in the axial direction of the linear portion 21. The center C2 of the curve of the centerline of the second connection portion 23 is present in a region that is located closer to the position where the second deflector 19 returns the balls 16 to the grooves 17 than the axis L1 of the linear portion 21 is in the direction perpendicular to the axis L1 of the linear portion 21 and that is located closer to the middle in the axial direction of the linear portion 21 than the second deflector 19 is in the axial direction of the linear portion 21.

The inside of the first connection portion 22 communicates with a passage hole 18a formed in the first deflector 18. The passage hole 18a is curved at its end located on the return passage member 20 side, and the centerline of the passage hole 18a curved at its end is continuous with the centerline of the first connection portion 22 at the connection point with the centerline of the first connection portion 22. The centerline of the passage hole 18a curved at its end and the centerline of the first connection portion 22 have a common tangent at the connection point. Since the passage hole 18a is curved as described above, the first deflector 18 changes the direction in which the balls 16 flow in the passage hole 18a between the direction in which the grooves 17 extend and the direction in which the first connection portion 22 is curved.

The inside of the second connection portion 23 communicates with a passage hole 19a formed in the second deflector 19. The passage hole 19a is curved at its end located on the return passage member 20 side, and the centerline of the passage hole 19a curved at its end is continuous with the centerline of the second connection portion 23 at the connection point with the centerline of the second connection portion 23. The centerline of the passage hole 19a curved at its end and the centerline of the second connection portion 23 have a common tangent line at the connection point. Since the passage hole 19a is curved as described above, the second deflector 19 changes the direction in which the balls 16 flow in the passage hole 19a between the direction in which the grooves 17 extend and the direction in which the second connection portion 23 is curved.

Figure 4:
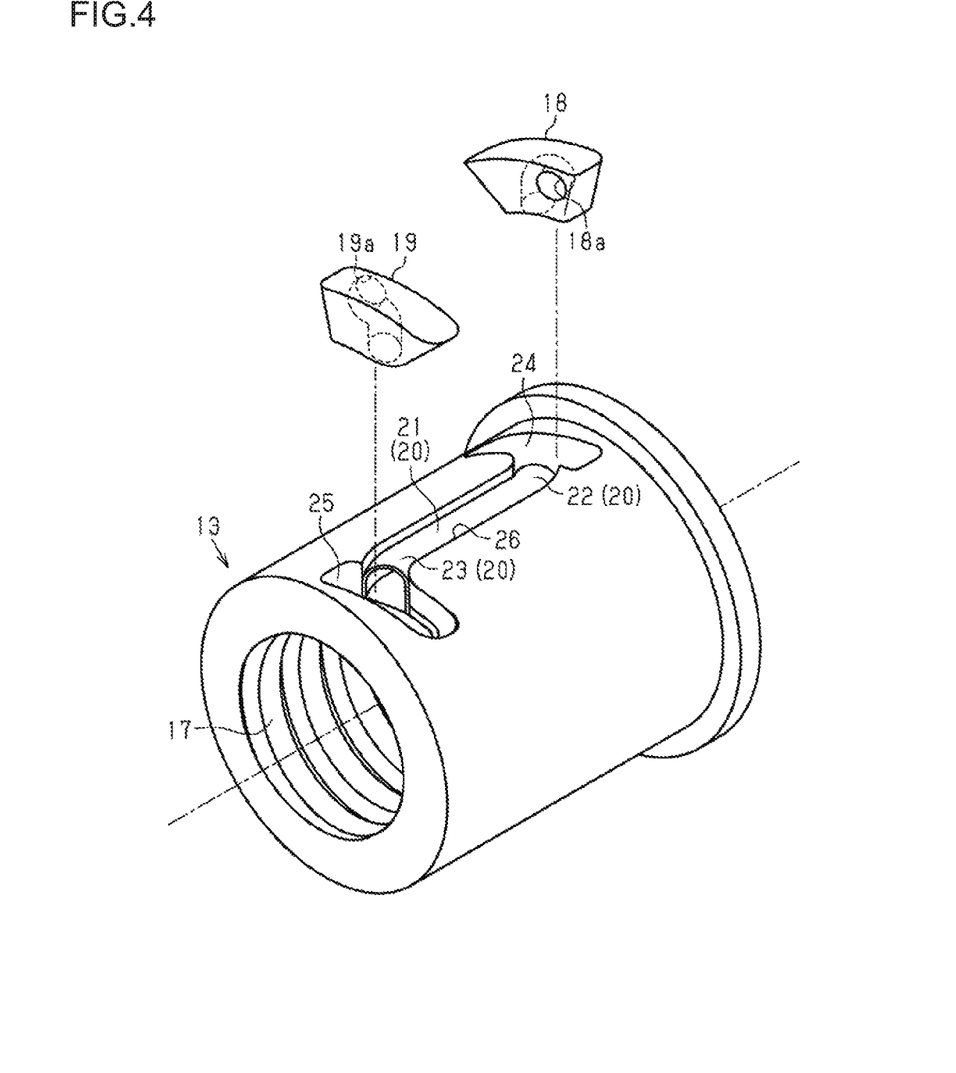
FIG. 4 is a perspective view showing attachment recesses and an attachment groove which are formed in the outer peripheral surface of the ball nut.

As shown in FIG. 4, the ball nut 13 has attachment recesses 24, 25 and an attachment groove 26 in its outer peripheral surface. The attachment recesses 24, 25 are recesses to which the first deflector 18 and the second deflector 19 are attached, respectively, and are formed so as to extend along the grooves 17. The attachment groove 26 is a groove to which the return passage member 20 (FIG. 3) is attached, and is formed between the attachment recesses 24, 25 so as to extend in the axial direction of the ball nut 13.

The first and second deflectors 18, 19 are attached to the ball nut 13 by fitting the first deflector 18 in the attachment recess 24 and fitting the second deflector 19 in the attachment recess 25. The return passage member 20 is attached to the ball nut 13 by fitting the return passage member 20 in the attachment groove 26. As shown in FIG. 3, the inside of the first connection portion 22 of the return passage member 20 communicates with the passage hole 18a of the first deflector 18 and the inside of the second connection portion 23 of the return passage member 20 communicates with the passage hole 19a of the second deflector 19 by attaching the first deflector 18, the second deflector 19, and the return passage member 20 to the ball nut 13 in this manner.

Figure 5:
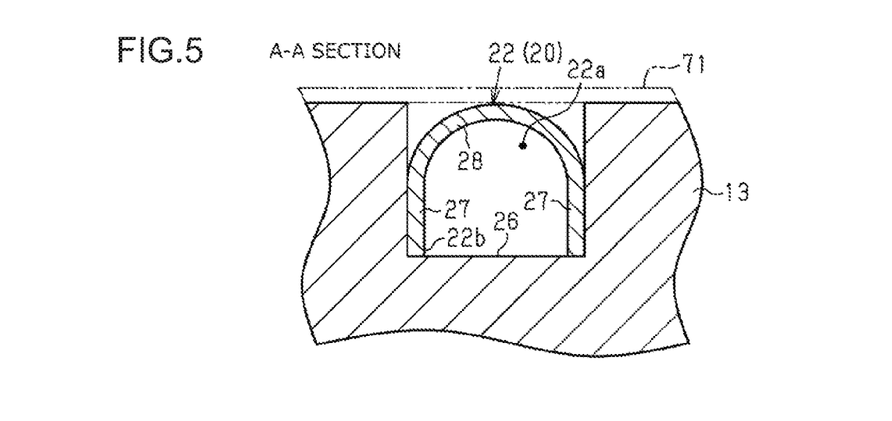
FIG. 5 is a sectional view showing a connection portion of the return passage member taken along line A-A and viewed in the direction of arrows A in FIG. 3.
Figure 6:
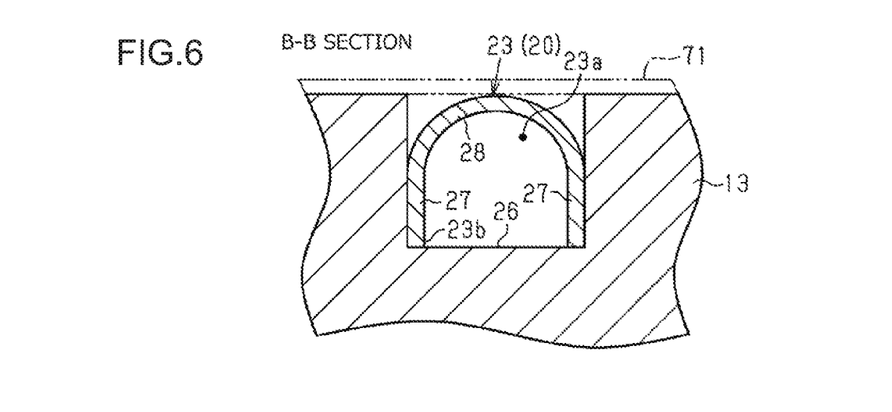
FIG. 6 is a sectional view showing a connection portion of the return passage member taken along line B-B and viewed in the direction of arrows B in FIG. 3.
Figure 7:
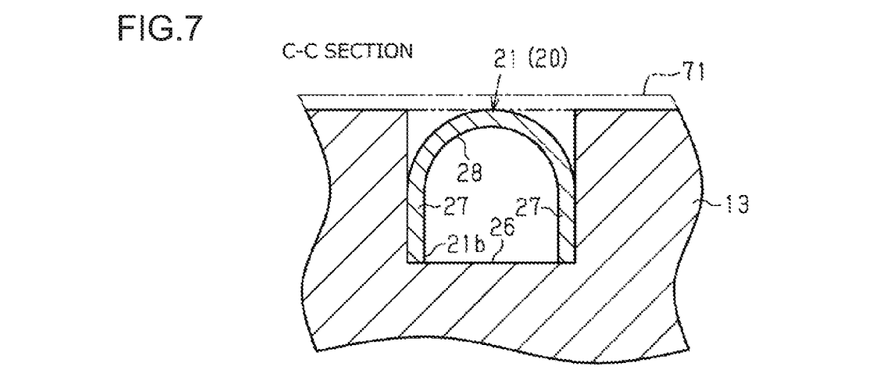
FIG. 7 is a sectional view showing a linear portion of the return passage member taken along line C-C and viewed in the direction of arrows C in FIG. 3.

FIGS. 5 to 7 show the first connection portion 22 taken along line A-A and viewed in the direction of arrows A in FIG. 3, the second connection portion 23 taken along line B-B and viewed in the direction of arrows B in FIG. 3, and the linear portion 21 taken along line C-C and viewed in the direction of arrows C in FIG. 3, respectively.

As shown in FIG. 5, the first connection portion 22 has openings 22a, 22b. The opening 22a opens in an end face of the return passage member 20, and the opening 22b opens in the outer periphery of the return passage member 20. The opening 22a in the end face of the return passage member 20 communicates with the passage hole 18a (FIG. 3) of the first deflector 18. The opening 22b in the outer periphery of the return passage member 20 opens toward the centerline of the ball nut 13 (downward in FIG. 5). This opening 22b opens on the side of the first connection portion 22 which faces the centerline of the ball nut 13 (i.e., opens on the lower side of the first connection portion 22 in FIG. 5) along the entire longitudinal length of the first connection portion 22, and is closed by the outer surface of the ball nut 13 (the bottom surface of the attachment groove 26). The inner peripheral surface of the driven pulley 71 fitted on the outer peripheral surface of the ball nut 13 contacts the first connection portion 22 of the return passage member 20.

As shown in FIG. 6, the second connection portion 23 has openings 23a, 23b. The opening 23a opens in an end face of the return passage member 20, and the opening 23b opens in the outer periphery of the return passage member 20. The opening 23a in the end face of the return passage member 20 communicates with the passage hole 19a (FIG. 3) of the second deflector 19. The opening 23b in the outer periphery of the return passage member 20 opens toward the centerline of the ball nut 13 (downward in FIG. 6). This opening 23b opens on the side of the second connection portion 23 which faces the centerline of the ball nut 13 (i.e., opens on the lower side of the second connection portion 23 in FIG. 6) along the entire longitudinal length of the second connection portion 23, and is closed by the outer surface of the ball nut 13 (the bottom surface of the attachment groove 26). The inner peripheral surface of the driven pulley 71 also contacts the second connection portion 23 of the return passage member 20.

As shown in FIG. 7, the linear portion 21 has an opening 21b. The opening 21b opens on the side of the linear portion 21 which faces the centerline of the ball nut 13 (i.e., opens on the lower side of the linear portion 21 in FIG. 7) along the entire longitudinal length of the linear portion 21. This opening 21b connects to the opening 22b (FIG. 5) in the outer periphery of the first connection portion 22 and the opening 23b (FIG. 6) in the outer periphery of the second connection portion 23, and is closed by the outer surface of the ball nut 13 (the bottom surface of the attachment groove 26). The inner peripheral surface of the driven pulley 71 also contacts the linear portion 21 of the return passage member 20.

As can be seen from FIGS. 5 to 7, each of the first connection portion 22, the second connection portion 23, and the linear portion 21 has a pair of standing walls 27 extending parallel to each other in the direction in which the balls 16 flow in the return passage member 20 (the direction crossing the plane of paper in FIGS. 5 to 7). Each of the first connection portion 22, the second connection portion 23, and the linear portion 21 further has an arc-shaped inter-wall portion 28 connecting one ends of the pair of standing walls 27 which are located farther away from the centerline of the ball nut 13 (the upper ends of the pair of standing walls 27 in FIGS. 5 to 7). The opening 22b (FIG. 5) in the outer periphery of the first connection portion 22, the opening 23b (FIG. 6) in the outer periphery of the second connection portion 23, and the opening 21b (FIG. 7) in the outer periphery of the linear portion 21 are formed to extend between the other ends of the pair of standing walls 27 which are located closer to the centerline of the ball nut 13 (the lower ends of the pair of standing walls 27 in FIGS. 5 to 7).

As shown in FIG. 3, the pair of standing walls 27 of the first connection portion 22 are curved, and the centers of the curves of the pair of standing walls 27 are located at the center C1 shown in FIG. 3. The outer standing wall 27 in the radial direction of the curve of the first connection portion 22 has a larger radius curvature than the inner standing wall 27 in the radial direction of the curve of the first connection portion 22. The difference in radius of curvature between these outer and inner standing walls 27 is slightly larger than the diameter of the balls 16.

The pair of standing walls 27 of the second connection portion 23 are also curved, and the centers of the curves of the pair of standing walls 27 are located at the center C2 in FIG. 3. The outer standing wall 27 in the radial direction of the curve of the second connection portion 23 has a larger radius of curvature than the inner standing wall 27 in the radial direction of the curve of the second connection portion 23. The difference in radius of curvature between these outer and inner standing walls 27 is slightly larger than the diameter of the balls 16.

The return passage member 20 of the ball recirculation system provided in the steering system has the first connection portion 22 that is curved so as to connect one end of the linear portion 21 provided between the first and second deflectors 18, 19 to the first deflector 18. The return passage member 20 further has the second connection portion 23 that is curved so as to connect the other end of the linear portion 21 to the second deflector 19.

When the return passage member 20 is produced, the first and second connection portions 22, 23 are curved as follows.

Figure 8:
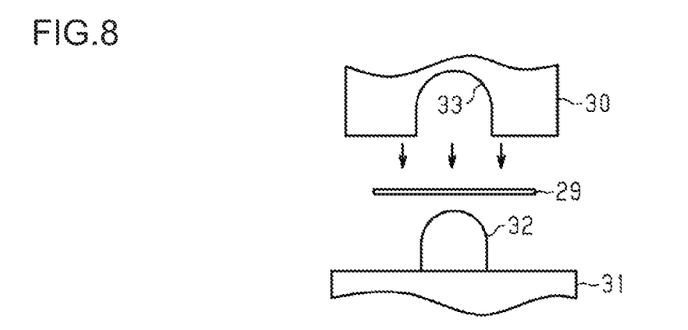
FIG. 8 is a schematic view showing how to produce the return passage member.
Figure 9:
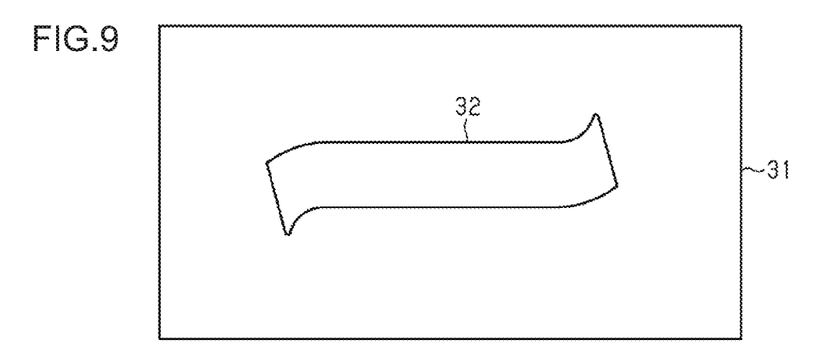
FIG. 9 is a schematic view showing a projecting portion of a male die of a press die that is used to produce the return passage member.
Figure 10:
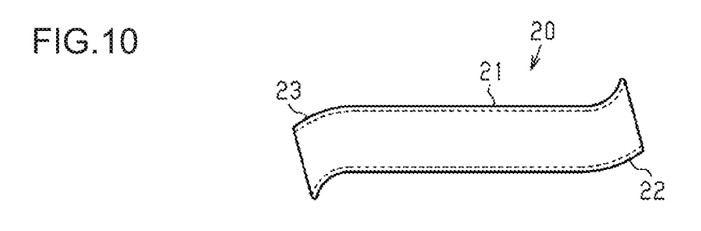
FIG. 10 is a plan view showing the produced return passage member.

FIGS. 8 to 10 schematically show how to produce the return passage member 20 and a machine that is used to produce the return passage member 20. As shown in FIG. 8, the return passage member 20 is produced by placing a plate-like material 29 of the return passage member 20 between a female die 30 and a male die 31 of a press die and then pressing the female die 30 against the male die 31.

The male die 31 has a projecting portion 32 projecting toward the female die 30. FIG. 9 shows the projecting portion 32 as viewed from above in FIG. 8. The outer shape of the projecting portion 32 corresponds to the inner shape of the return passage member 20 (FIGS. 5 to 7). As shown in FIG. 8, the female die 30 has a recess 33 in a portion corresponding to the projecting portion 32. The inner shape of the recess 33 corresponds to the outer shape of the return passage member 20.

Accordingly, when the female die 30 is pressed against the male die 31 with the material 29 being interposed therebetween as described above, the material 29 is sandwiched between the projecting portion 32 and the recess 33 and is deformed. The return passage member 20 having the shape shown in FIGS. 5 to 7 is produced in this manner. As shown in FIG. 10, the return passage member 20 thus produced has the curved first and second connection portions 22, 23 connecting to the linear portion 21. When the return passage member 20 is produced as described above, the first and second connection portions 22, 23 are formed by the curves of both longitudinal ends of the projecting portion 32 of the male die 31 and the curves of both longitudinal ends of the recess 33 of the female die 30.

Figure 11:
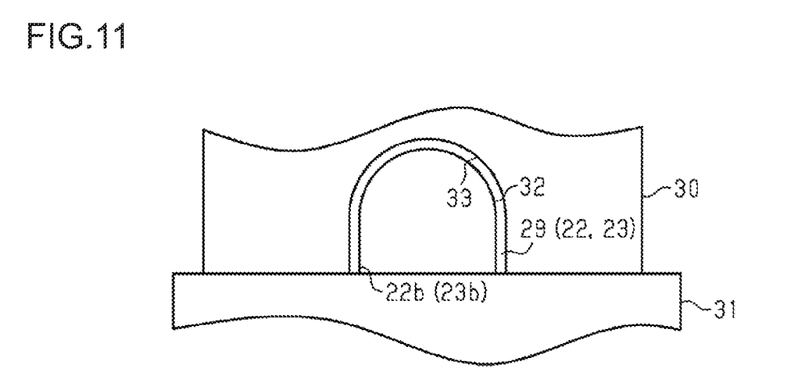
FIG. 11 is a schematic view of a material for forming the return passage member (first and second connection portions) being sandwiched between dies of a press machine.

As shown in FIG. 10, both longitudinal ends of the return passage member 20 (material 29) are curved so as to form the first and second connection portions 22, 23. This is implemented by sandwiching and restricting both longitudinal ends of the return passage member 20 (material 29) between the projecting portion 32 of the male die 31 and the recess 33 of the female die 30 as shown in FIG. 11. Since the openings 22b, 23b are formed in the first and second connection portions 22, 23 of the return passage member 20, the process of curving both longitudinal ends of the return passage member 20 (material 29) can be performed with the projecting portion 32 being inserted from the portions of the material 29 which correspond to the openings 22b, 23b. This can restrain the inside diameters of the first and second connection portions 22, 23, namely the inside diameters of the first and second connection portions 22, 23 in the direction of the radius of curvatures of the curves of the first and second connection portions 22, 23 (the lateral direction in FIG. 11), from being reduced by deformation of both longitudinal ends of the return passage member 20 when both longitudinal ends of the return passage member 20 are curved.

Functions of the ball screw and the steering system will be described below.

If the inside diameters of the first and second connection portions 22, 23 are reduced as described above, the balls 16 in the grooves 17 are subjected to increased resistance when they pass through the first connection portion 22 and the second connection portion 23 to recirculate through the first deflector 18, the return passage member 20, and the second deflector 19 in the ball screw 15 having the return passage member 20 attached thereto. Such increased resistance hinders smooth flow of the balls 16. However, since reduction in inside diameter of the first and second connection portions 22, 23 is restrained, an increase in resistance the balls 16 are subjected to when passing through the first and second connection portions 22, 23 can be restrained, whereby smooth flow of the balls 16 can be achieved.

The present embodiment described in detail above has the following advantageous effects.

When the balls 16 flowing in the grooves 17 are returned from downstream to upstream through the return passage member 20 of the ball recirculation system to recirculate in the ball screw 15, the balls 16 can flow smoothly in the first and second connection portions 22, 23 of the return passage member 20, and fluctuations in rotation resistance of the ball nut 13 can be reduced.

The openings 21b, 22b, 23b in the outer periphery of the return passage member 20 are formed along the entire longitudinal length of the return passage member 20 so as to open toward the centerline of the ball nut 13. Accordingly, when the return passage member 20 is produced, the first and second connection portions 22, 23 can be formed by curving both longitudinal ends of the return passage member 20 (material 29) with the projecting portion 32 being inserted into the material 29 (return passage member 20) along the entire length of the material 29 from the portions of the material 29 which correspond to the openings 21b, 22b, 23b. In this case, when both longitudinal ends of the return passage member 20 (material 29) are curved in order to form the first and second connection portions 22, 23, the projecting portion 32 has been inserted in the return passage member 20 (material 29) along the entire longitudinal length of the return passage member 20. This can restrain the influence of the process of curving both longitudinal ends of the return passage member 20 (material 29) on the linear portion 21 of the return passage member 20.

The return passage member 20 is fitted in the attachment groove 26 formed in the outer peripheral surface of the ball nut 13, and the openings 21b, 22b, 23b of the linear portion 21, the first connection portion 22, and the second connection portion 23 of the return passage member 20 are closed by the bottom surface of the attachment groove 26. Since the return passage member 20 is fitted in the attachment groove 26 formed in the outer peripheral surface of the ball nut 13 and is connected to the first deflector 18 and the second deflector 19, the return passage member 20 connecting the first and second deflectors 18, 19 can be easily held in the ball nut 13.

The driven pulley 71 is fitted on the outer peripheral surface of the ball nut 13, and the return passage member 20 disposed in the ball nut 13 is held against the ball nut 13 by the inner peripheral surface of the driven pulley 71. This can restrain the return passage member 20 from coming off from the ball nut 13 due to clogging of the return passage member 20 with the balls 16 or due to the centrifugal force generated by rotation of the ball nut 13.

For example, the above embodiment can be modified as follows.

The present invention is applicable to ball screws that are used in devices other than steering systems. In such applications, the ball screws may convert linear motion of the ball screw shaft to rotary motion of the ball nut.

The return passage member 20 disposed in the ball nut 13 need not necessarily be held by the inner peripheral surface of the driven pulley 71.

In the case of not using the structure in which the return passage member 20 is held by the inner peripheral surface of the driven pulley 71, the attachment groove 26 in the outer peripheral surface of the ball nut 13 may be omitted. In this case, the return passage member 20 may be attached so as to project radially outward from the outer peripheral surface of the ball nut 13, and the openings 21b, 22b, 23b of the return passage member 20 may be closed by the outer peripheral surface (outer surface) of the ball nut 13.

In the return passage member 20, the opening 21b of the linear portion 21 may be omitted, and only the first and second connection portions 22, 23 may have the openings 22b, 23b. In this case, a material having a tubular shape in a portion corresponding to the linear portion 21 and having a plate shape in portions corresponding to the first and second connection portions 22, 23 may be used to form the return passage member 20. In the case of using such a material to form the return passage member 20, only the portions of the material which correspond to the first and second connection portions 22, 23 may be sandwiched between the female die 30 and the male die 31 of the press die for producing the return passage member 20, so that the first and second connection portions 22, 23 are formed by the projecting portion 32 of the male die 31 and the recess 33 of the female die 30.

What is claimed is:

1. A ball screw comprising:
   a ball nut;
   a ball screw shaft extending through the ball nut;
   a first deflector;
   a second deflector;
   a return passage member including: (i) a linear portion located between the first deflector and the second deflector in the ball nut, (ii) a first connection portion curved to serve as a portion connecting one end of the linear portion to the first deflector, and (iii) a second connection portion curved to serve as a portion connecting another end of the linear portion to the second deflector, each of the first connection portion and the second connection portion having an opening in an outer periphery and an end face of the return passage member, each of the openings in the outer periphery opens toward a centerline of the ball nut and is closed by an outer surface of the ball nut; and
   a groove formed between an outer peripheral surface of the ball screw shaft and an inner peripheral surface of the ball nut, the groove accommodating a plurality of balls, wherein:
      the ball screw converts rotary motion and linear motion and vice versa between the ball nut and the ball screw shaft via the plurality of balls and the groove, and when performing the conversion:
         the ball screw deflects the plurality of balls rolling in the groove by the first deflector, then transfers the plurality of balls to the second deflector through the return passage member, and returns the plurality of balls from the second deflector to the groove, or
         the ball screw deflects the plurality of balls rolling in the groove by the second deflector, then transfers the plurality of balls to the first deflector through the return passage member, and returns the plurality of balls from the first deflector to the groove;
      the first deflector and the second deflector are disposed in the ball nut so as to extend along the groove;
      each of the first connection portion and the second connection portion is curved so that a centerline of each of the first connection portion and the second connection portion forms a curve;
      a center of the curve of the centerline of the first connection portion is located in a region that is located closer to a position where the first deflector deflects the plurality of balls than an axis of the linear portion of the return passage member in a direction perpendicular to the axis of the linear portion, and the center of the curve of the centerline of the first connection portion is located closer to a middle in an axial direction of the linear portion than the first deflector in the axial direction of the linear portion; and
      a center of the curve of the centerline of the second connection portion is located in a region that is located closer to a position where the second deflector returns the plurality of balls than the axis of the linear portion of the return passage member in the direction perpendicular to the axis of the linear portion, and the center of the curve of the centerline of the second connection portion is located closer to the middle in the axial direction of the linear portion than the second deflector in the axial direction of the linear portion.

2. The ball screw according to claim 1, wherein:
the opening in the outer periphery of the first connection portion opens on a side of the first connection portion which faces the centerline of the ball nut along an entire longitudinal length of the first connection portion,
the opening in the outer periphery of the second connection portion opens on a side of the second connection portion which faces the centerline of the ball nut along an entire longitudinal length of the second connection portion, the linear portion has an opening in an outer periphery of the linear portion, and the opening of the linear portion opens on a side of the linear portion which faces the centerline of the ball nut along an entire longitudinal length of the linear portion, the opening connects to the opening in the outer periphery of the first connection portion and the opening in the outer periphery of the second connection portion, and the opening is closed by the outer surface of the ball nut.

3. The ball screw according to claim 2, wherein:

each of the first connection portion, the linear portion, and the second connection portion has a pair of standing walls extending parallel to each other in a direction in which the plurality of balls flow in the return passage member, and an inter-wall portion connecting ends of the pair of standing walls which are located farther away from the centerline of the ball nut, and the opening in the outer periphery of the first connection portion, the opening in the outer periphery of the linear portion, and the opening in the outer periphery of the second connection portion are formed between other ends of the pair of standing walls which are located closer to the centerline of the ball nut.

4. The ball screw according to claim 1, wherein the return passage member is fitted in a groove formed in an outer peripheral surface of the ball nut, and a bottom surface of the groove serves as the outer surface of the ball nut which closes the opening in the outer periphery.

5. The ball screw according to claim 1, wherein:

a first passage hole for the plurality of balls, which is formed inside the first deflector, is curved at an end located on a return passage member side, a centerline of the passage hole curved at the end is continuous with the centerline of the first connection portion at a connection point with the centerline of the first connection portion, and the centerline of the passage hole curved at the end and the centerline of the first connection portion have a common tangent at the connection point, and a second passage hole for the plurality of balls, which is formed inside the second deflector, is curved at an end located on the return passage member side, a centerline of the passage hole curved at the end is continuous with the centerline of the second connection portion at a connection point with the centerline of the second connection portion, and the centerline of the passage hole curved at the end and the centerline of the second connection portion have a common tangent at the connection point.

6. A steering system comprising:

the ball screw according to claim 1; and a steered shaft, wherein the ball screw shaft forms a part of the steered shaft.

7. The steering system according to claim 6, further comprising:

a motor; and a cylindrical member that transmits torque of the motor to the ball nut, the cylindrical member being fitted on the outer peripheral surface of the ball nut, and an inner peripheral surface of the cylindrical member contacting the return passage member.

* * * * *